United States Patent [19]

Cardone et al.

[11] 4,304,292

[45] Dec. 8, 1981

[54] SHOWER

[76] Inventors: Jeremiah V. Cardone, 2971 Johnson Pl.; Joseph J. Fabiano, 1761 Harold Ave., both of Wantagh, N.Y. 11793

[21] Appl. No.: 164,841

[22] Filed: Jun. 30, 1980

Related U.S. Application Data

[63] Continuation-in-part of Ser. No. 57,607, Jul. 16, 1979, abandoned.

[51] Int. Cl.$^3$ .............................................. F24H 1/00
[52] U.S. Cl. ......................................... 165/1; 165/47; 165/156; 165/163; 165/164; 165/DIG. 12; 237/8 R
[58] Field of Search ............... 165/DIG. 2, DIG. 12, 165/470, 156, 163, 164, 169, 168; 237/8 R; 165/1

[56] References Cited

U.S. PATENT DOCUMENTS

| | | | |
|---|---|---|---|
| 2,820,615 | 1/1958 | Peters | 165/169 |
| 3,946,802 | 3/1976 | Christenson | 165/35 |
| 4,150,787 | 4/1979 | Braathen | 165/DIG. 12 |
| 4,202,406 | 5/1980 | Avery | 165/DIG. 12 |

FOREIGN PATENT DOCUMENTS

| | | |
|---|---|---|
| 214788 | 10/1909 | Fed. Rep. of Germany ...... 165/164 |
| 2304537 | 8/1974 | Fed. Rep. of Germany ... 165/DIG. 12 |
| 2806029 | 8/1979 | Fed. Rep. of Germany ... 165/DIG. 12 |

*Primary Examiner*—Albert W. Davis
*Assistant Examiner*—Margaret A. Focarino

[57] ABSTRACT

For a shower for a household, dormitory or the like, which typically has a limited volume of boiler-heated water available for use, the cold water input to the shower is passed in heat exchange with the discharging tepid water to thereby convert same to a lukewarm water source, the temperature change being typically a 15 to 25 degree rise, whereby significantly less boiler-heated water is required for preparing a suitable tepid water mixture confortable for showering. The aforesaid significantly prolongs the showering service use of the system and, since less boiler-heated water is consumed, correspondingly lessens the fuel consumption of the boiler.

10 Claims, 10 Drawing Figures

SHOWER

This is a continuation-in-part of Application Ser. No. 057,607, filed July 16, 1979, and now abandoned.

The present invention relates generally to improvements for showers typically used in households, dormitories, or the like, the improvements more particularly resulting in significantly more effective use being made of the boiler-heated water used for showering, with attendant savings in fuel consumption as well as greater convenience in the use of the system for showering service.

It is already known, as exemplified by prior U.S. Pat. No. 4,150,787, that the heat content of the tepid water discharge of showers should be salvaged in order to achieve energy conservation objectives. Thus, said discharging tepid water is used to preheat the water delivered to the boiler, thereby requiring less heating, and thus less fuel, in preparing this water for household service. The prior art handling of the tepid water discharge, as just noted, provides only marginal benefits, and has little or no effect on the convenience use of the system for showering. For example, in a hot water system of limited capacity, the use thereof for three or so consecutive showers will, even with the noted prior art technology, still typically "run out" of hot water.

Broadly, it is an object of the present invention to provide an improved energy-conserving shower for households or the like overcoming the foregoing and other shortcomings of the prior art. Specifically, it is an object to provide a method of operating a household shower so as to minimize the use requirement of boiler-heated water, such that less fuel is consumed in preparing this water source, and what volume thereof that is available, even of a limited quantity, is typically more than adequate for showering service.

A household, dormitory or similar end-use shower set-up, either of a tub or stall type, demonstrating objects and advantages of the present invention contemplates heat exchanging the tepid water shower discharge with the cold water input, not to the boiler as recommended by the prior art, but to the shower per se, thereby providing as the two inputs to the shower a boiler-heated water source and a lukewarm water source, the latter being the result of said heat exchange. In the mixing of these two sources to arrive at a water temperature comfortable for showering, which usually is 110 degrees Fahrenheit, the ability to use lukewarm, rather than cold, water results in substantial diminishment in consumption of the boiler-heated water, and thus the fuel savings and added convenience already noted.

The above brief description, as well as further objects, features and advantages of the present invention, will be more fully appreciated by reference to the following detailed description of presently preferred, but nonetheless illustrative embodiments in accordance with the present invention, when taken in conjunction with the accompanying drawings, wherein.

Figure 3:
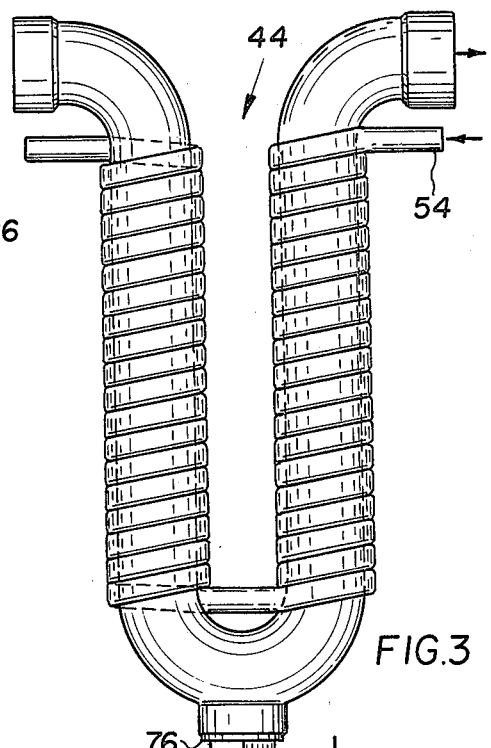
FIG. 3 is a front elevational view, on an enlarged scale, illustrating one embodiment of a heat exchanger for practicing the method and for using the preferred structure of the present invention.
Figure 4:
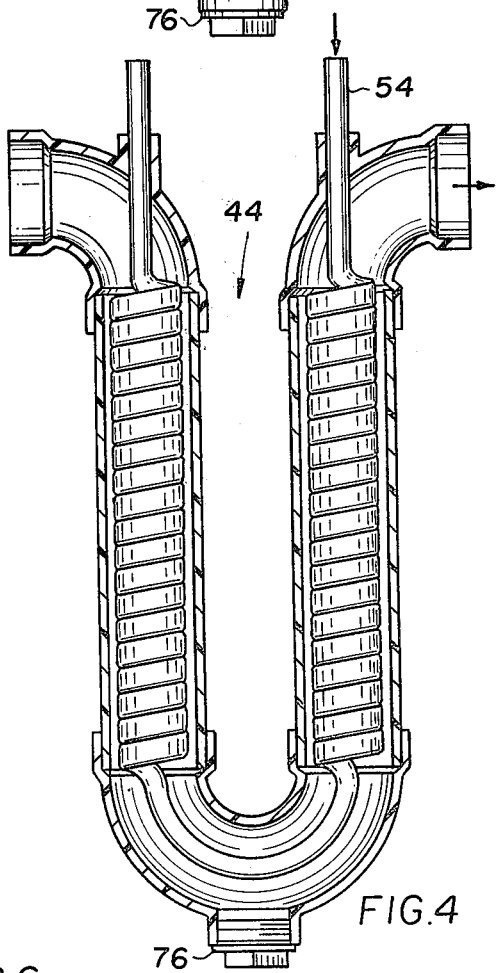
Figure 5:
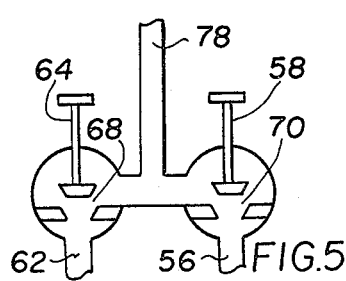
Figure 6:
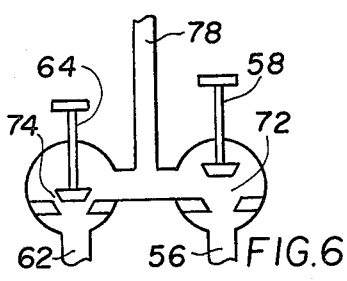

FIG. 4, like FIG. 3, is similarly an enlarged front elevational view, but of another embodiment of a heat exchanger according to the present invention;

FIGS. 5 and 6 are simplified instruction diagrams illustrating, by comparison, how the boiler-heated warm water input to the household shower is favorably affected by the within invention; and FIGS. 7-10 illustrate still another embodiment of the inventive shower hereof in which, more particularly, the heat exchanger is embodied in the floor of the shower.

Figure 7:
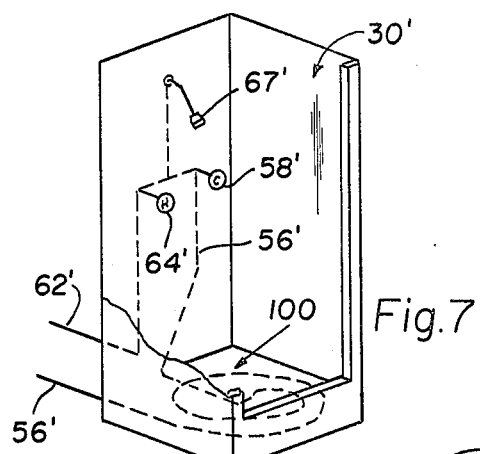
Figure 8:
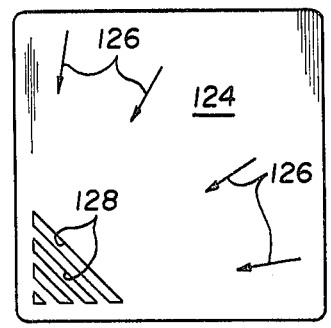
Figure 10:
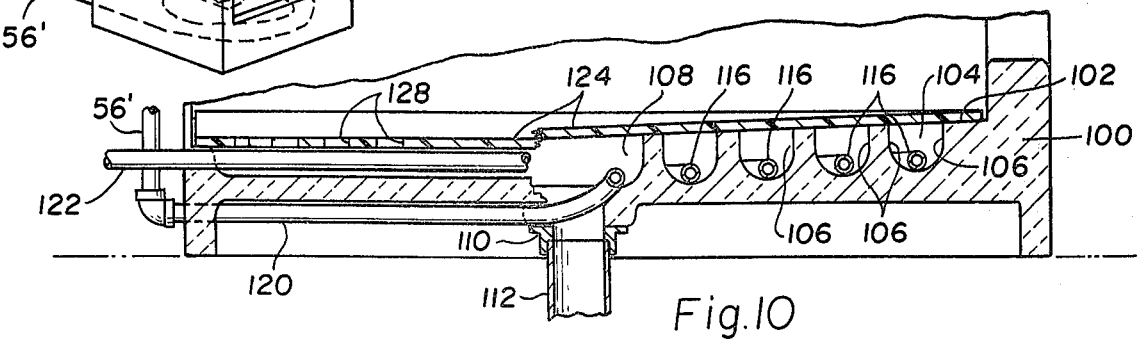
Figure 9:
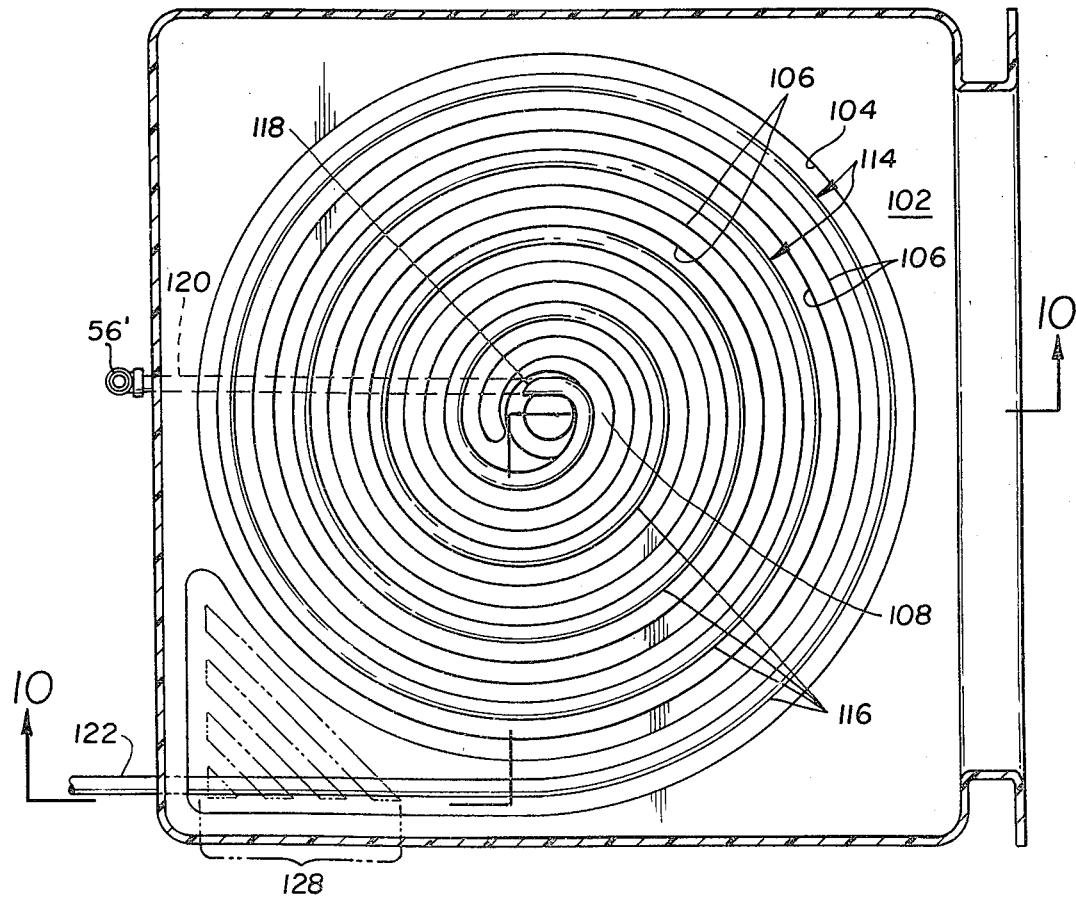

FIG. 7 illustrates this additional embodiment in perspective, with portions of the shower broken away and with the plumbing to the shower illustrated in simplified diagrammatic fashion;

FIG. 8 is a plan view of a removable floor panel of this shower embodiment;

FIG. 9, like FIG. 8, is also a plan view, but on an enlarged scale and illustrating the heat exchanger which is situated below the floor panel of FIG. 8; and FIG. 10 is a side elevational view, in section taken along line 10—10 of FIG. 9, showing further structural details of this additional embodiment of the within inventive shower.

THE PRIOR ART

Figure 1:
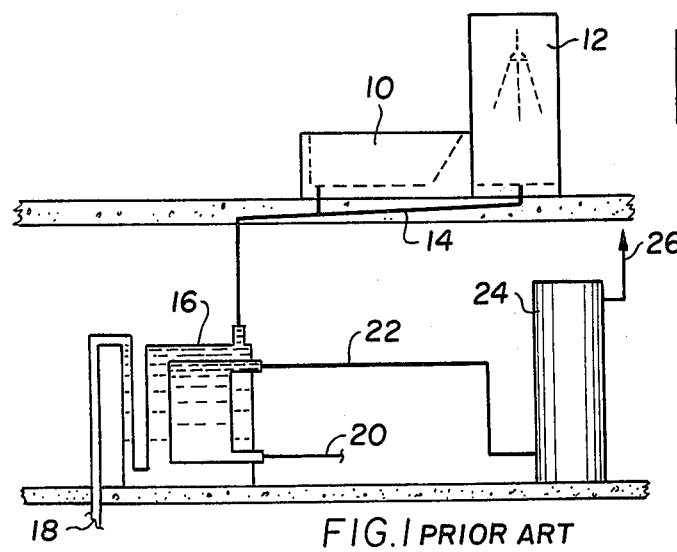
FIG. 1 is a simplified front elevational view illustrating a prior art conservation technique for boiler-heated water for a typical household.

The prior art includes many conservation techniques for the handling of boiler-heated water. As disclosed for example in U.S. Pat. No. 4,150,787, and as illustrated in FIG. 1, water used for bathing or showering in a tub 10 or a stall shower 12 when exiting therefrom is recognized as being at an elevated temperature and thus useful in achieving energy conservation results. Thus, as illustrated in FIG. 1, the exiting water is drained through a conduit 14 into a heat exchanger 16 before it is allowed to discharge to a sewer connection, as at 18. According to the prior art, the cold water input of the household, denoted by reference numeral 20, is passed through the heat exchanger 16 and, as a result, it is claimed there is effective heat transfer to said water such that it is preheated when delivered through conduit 22 and made a part of the volume of water being stored in the hot water heater or boiler 24. As understood, the referred to storage volume of water is delivered to service for household use through conduit 26 having an appropriate connection with the points of use 10, 12 and to other locations throughout the dwelling, being the so-called hot water connection at the referred to locations. Thus, from time to time and as needed, the storage volume of water in the boiler 24 is heated and this results in fuel consumption by the boiler 24. To the extent that the water input to boiler 24 is preheated by the discharging water in heat exchanger 16, it is claimed that there is significant savings in fuel and thus effective energy conservation in the prior art set-up of FIG. 1.

INVENTIVE SHOWER EMBODIMENTS OF FIGS. 2-4

Figure 2:
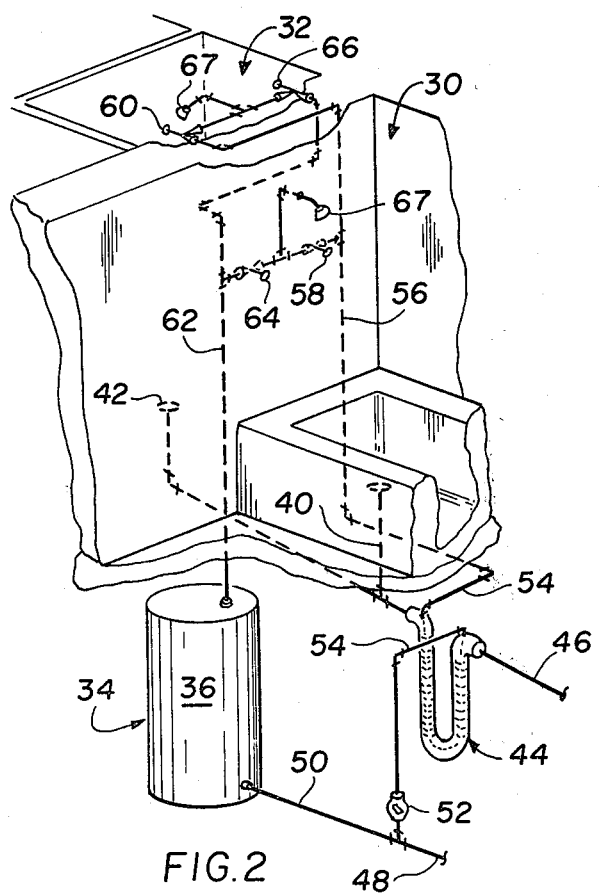
FIG. 2 is a simplified diagrammatic view of the water connections to and from a household shower embodying the improved conservation technique according to the present invention.

As illustrated in FIG. 2, and as will be described in detail subsequently, use is also made herein of the discharging water from the household shower, either of the tub-type 30 or stall-type 32, to effectuate significant energy conservation, but the magnitude thereof far exceeds even the most favorable benefits claimed for the prior art set-up of FIG. 1. More particularly, a typical household may have a boiler 34 of the type which includes a storage tank 36 which tank, depending upon its size, provides a prescribed or limited capacity of boiler-heated water available for use for such purposes as showering at the locations 30, 32. Moreover, whatever might be the savings in fuel consumption, it is not uncommon for the limited capacity of the boiler-heated water in storage tank 36 to be insufficient on any given occasion when the showers 30 or 32 are being used, and thus for the hot or boiler-heated water to "run out" during successive showers.

Among other benefits, the improvements of the within invention obviate the prior art shortcoming just noted even with a typical boiler-heated water storage tank 36 of conventional dimensions and capacity. Further, since there is less boiler-heated water used during showering, it necessarily follows that there is less fuel consumed in the operation of the boiler 34 and thus there is this benefit or objective achieved by the within invention as well.

Still referring to FIG. 2, it will be understood that the inventive set-up for the showers 30 or 32 includes either both a tub drain conduit 40 and a stall shower drain 42 or, if there is only one shower then only one drain. Whatever the case, said drain channels the discharging water through a trap of U-shaped design, designated 44, on its way to a sewer connection, as at 46. It is helpful to note that underlying the present invention is the recognition that the water discharging through the U-shaped conduit 44 is, in most cases, tepid, being a mixture of the boiler-heated warm water and cold water inputs to the showers 30, 32. It is thus also part of the within invention to extract, by heat transfer, the heat energy represented by the tepid condition of the discharging water which, if not extracted, would otherwise be lost in the sewer discharge 46.

In sharp contrast to the prior art, however, the referred to heat transfer is conducted with the cold water input to the showers 30 and 32 for the purposes of having the significant results as soon will be described, rather than attempting merely to preheat the water being supplied to the storage tank 36 of boiler 34. Thus, and as clearly illustrated in FIG. 2, the cold water input 48 from a suitable source has a conduit connection 50 to the boiler storage tank 34 for replenishing the supply thereof, and the usual connection for the cold water to the showers 30 and 32 is, according to the present invention, channeled through a check valve 52 and, more importantly, through a length of conduit 54 that operationally is placed in heat exchange relation with the premixed tepid water discharging through the U-shaped conduit 44. For completeness' sake, it is to be noted that the cold water input or heat exchange conduit 54 has an extension 56 which can be traced to the cold water faucet 58 (traditionally on the right side) of the tub shower 30 and which crosses over (to assume that same position on the right-hand side) so as to have an appropriate connection to the cold water faucet 60 of the stall shower 32. Boiler-heated "hot" water for showering is channeled through the conduit connection 62 from the boiler tank 36 to the hot water faucet 64 of the tub shower 30 and to the hot water faucet 66 of the stall shower 32. As understood, in use the "hot" water faucets 60, 64 and the "cold" water faucets 56, 58 are respectively opened to the degree required for their mixing to provide a tepid temperature comfortable for showering purposes in the water exiting from the shower heads 67. The referred to tepid water, when drained through the conduit connections 40 or 42 into the U-shaped conduit 44 serving as a heat exchanger, provides the heat transfer to the cold water input being delivered through the conduit 54 to the showers. In effect, thereefore, the cold water input 48 is rendered, as a result of the heat transfer at the U-shaped conduit 44, a lukewarm water source prior to use in the showers 30, 32. In other words, during showering the opening of the "cold" water faucets 58 or 60 supplies lukewarm water for showering purposes.

Although the advantages attendant to using lukewarm water instead of cold water in preparing a tepid water mixture for showering purposes should be apparent, for completeness' sake the significant aspects of these advantages will now be noted in connection with the instruction diagrams of FIGS. 5 and 6. More particularly, it will be understood that in FIG. 5 typical positions are shown for the faucet control for the "hot" and "cold" volumes of water that might typically be used for the tub shower 30. More particularly, faucet 64 is shown in its raised position providing a clearance 68 for boiler-heated water being delivered to this faucet through conduit 62, while the cold water being delivered through conduit 56 is controlled as to its volume by clearance 70 that is provided by the operational position assumed by the cold water faucet 58. As understood, the boiler-heated water and the cold water that is allowed to pass by the faucets 64 and 58 is mixed in conduit 78 during travel to the shower head 68 and, in so doing, exits from such shower head 68 at a tepid temperature comfortable for showering purposes.

Referring now to FIG. 6 in which similar structural features or operating conditions are designated by the same reference numerals, the important operational differences attributable to use of the within invention may be clearly noted. More particularly, because conduit 56 delivers lukewarm water, for the same volume input for the shower head 68 the clearance 72 of faucet 58 is considerably enlarged, whereas clearance 74 of faucet 64 which controls the amount of boiler-heated water that is used in showering is significantly diminished. In practice, it has been found that the diminishment of the boiler-heated water that is required to provide a tepid mixture suitable for showering is such that the storage tank 36 of boiler 34 in the conventional sizes supplied for a one or two-family dwelling is more than adequate for showering purposes.

In the above respect, it has been noted that the discharging water that normally drains is approximately 100° Fahrenheit at the time encountering the U-shaped conduit 44. This otherwise wasted 100° Fahrenheit water is effectively passed in heat exchange relation to the cold water input, which in the community of Wantagh, N.Y., is typically supplied at 50° Fahrenheit. The heat exchange has been found in practice to provide a lukewarm water source at approximately 65° to 75° Fahrenheit for delivery to the faucet connection 58, 60 of the showers 30, 32. This increase in approximately 15° to 25° F. significantly diminishes the amount of boiler-heated water that is required to be delivered to the showers 30, 32. While the beneficial results depend on different operating conditions and thus cannot be defined with precision, in practice use of the invention for 28 successive showers at a selected tepid temperature of 110° Fahrenheit for the premixed water and during a selected duration time for showering of 10 minutes which consumed approximately 15 gallons of water per shower, resulted in the boiler having to be operated only half the time using the invention as against non-use thereof. Even more important, in the field tests conducted there was adequate boiler-heated hot water for all of the 28 successive showers even though a so-called tankless hot water heating system was used. In such a "tankless" hot water heating system, there is a very small, almost nominal, storage tank for the boiler-heated water since such system relies on the rapidity of the boiler operation to produce the hot water that is required for service. In such "tankless" hot water systems, it is thus not unusual for the system to "run out" of hot water after only three typical ten-minute showers without the invention. As already noted, using the within invention herein described, it was possible to have 28 successive ten-minute showers with sufficient boiler-heated water to provide the tepid water mixture at a temperature of 110° Fahrenheit, and thus at a temperature that would generally be agreed to be comfortable for showering purposes.

Although the U-shaped conduit 44 for the discharging premixed water and the cold water input conduit 54 cooperating therewith to provide a heat exchange function may be implemented by any one of several suitable constructions there are two constructions which are preferred, and these are illustrated in FIGS. 3 and 4. More particularly, as illustrated in FIG. 3, when the U-shaped conduit 44 is fabricated of copper it is preferred to provide the conduit 54 in the form of 90 feet of flat copper ribbon-type tubing in wrapped relation externally about th U-shaped conduit 44.

In the FIG. 4 embodiment, the construction material of the U-shaped conduit 44 will be understood to be polyvinyl chloride and, in this instance, the cold water input conduit 54, in a suitable coiled configuration as illustrated, is appropriately mounted internally of the U-shaped conduit 44 with the discharging water passing essentially through the coils and undergoing at this time heat transfer to the cold water flowing through the conduit 54. In both embodiments of FIGS. 3 and 4, the U-shaped conduit 44 has a threadably removable plug 76 for cleaning purposes.

INVENTIVE SHOWER EMBODIMENT OF FIGS. 7–10

Many structural features that have already been described are utilized in the additional embodiment of the within inventive shower illustrated in FIGS. 7–10 and thus, for brevitys' sake, the description thereof will not be repeated and these structural features will be designated by the same but primed reference numerals. What distinguishes shower embodiment 30' is the helical configuration of the heat exchange of the cold water input to the shower, the advantageous location of this heat exchanger in the floor of the shower, and other such features now to be described in detail.

As is perhaps best illustrated in FIGS. 9, 10, the floor of shower 30' includes a base 100 in the upper face or surface 102 of which there is embodied, in any appropriate manner, a spiral trough, generally designated 104 in FIG. 9 and the individual helical turns of which are designated individually and collectively 106 in FIG. 10. By slight increases in depth of the individual helical turns 106 the trough 104 is pitched to drain towards central opening 108 of base 100, in which opening there is an appropriate drain fitting 110 which mounts a depending conduit 112 which will be understood to discharge into a sewer or the like. In accordance with the present invention, a pipe 114 suitable for flowing water to the shower 30' and itself in a helical configuration as illustrated, is deposited in the correspondingly helically configurated trough 104. That is, and as is perhaps best illustrated in FIG. 10, the individual helical turns of the spiral pipe 114, designated individually and collectively 116 in FIG. 10, are each located in a cooperating one of the helical turns 106 of the spiral trough 104. Connected at the center, as at 118 (FIG. 9), to the spiral pipe 114 is the shower cold water inlet pipe or conduit 122. The cold water outlet connection from the spiral pipe 114, designated 120, extends from the outermost helical turn and is connected to the shower faucet cold water conduit 56'. As a result, the cold water input to the shower 30' is delivered through the helical heat exchanger 114 prior to delivery through the shower head 67'. More particularly, cold water from a suitable source initially flows through the inlet pipe 120, then successively through each of the helical turns 116 to the helical pipe 114, and then finally through the outlet pipe 120 into the faucet pipe 56' where, upon opening of the valve 58', the water is discharged through the shower nozzle 67'.

In accordance with the present invention, the tepid water being used for showering purposes and discharging through the shower head 67' is passed in heat exchange with the cold water being flowed through the helical heat exchanger 114, such that said cold water experiences an increase in temperature which, as already noted, is typically in a range from 15 to 25 degrees Fahrenheit, and which results in the input water, which is supplied typically at 50 degrees Fahrenheit, actually being delivered to the shower head 67' between 65 degrees to 75 degrees Fahrenheit. As already explained, particularly in connection with FIGS. 5 and 6, this results in requiring less boiler-heated water to be supplied to the shower 30' via the hot water faucet inlet conduit 62'.

In a practical and workable embodiment, the helical heat exchanger 114 must of course be covered and thus this shower embodiment is provided with a floor panel 124 in an appropriate shape and size so that it is readily placed in covering relation over the helical trough 104 and, if need be, readily removed therefrom. To promote maximum heat exchange between the tepid water discharging from the shower head 67', panel 124 is provided with an appropriate pitch which causes the tepid water to flow, as indicated by the arrows 126 in FIG. 8, towards one corner of the panel through which the tepid water drains through openings 128 and enters into the helical spiral trough 104 containing the helical heat exchanger 114. As a result, the tepid water flows through the helical turns 116 of the trough 104 towards the center drain opening 108 and, in the process, passes in heat exchange with the cold water flowing through the helical pipe turns 116 on its way to the faucet inlet pipe 56'. Thus the shower embodiment 30' of FIGS. 7–10 achieves the same savings in fuel achieved by the already described shower embodiments of FIGS. 2–4.

Although shower embodiments that would be typically installed in a household have been described herein, it will of course be understood that the invention is not limited to use with such showers, but can also be used in showers installed in dormitories, hotels, and other such establishments. In other respects as well, a latitude of modification, change and substitution is intended in the foregoing disclosure and in some instances, some features of the invention will be employed without a corresponding use of other features. Accordingly, it is appropriate that the appended claims be construed broadly and in a manner consistent with the spirit and scope of the invention herein.

What is claimed is:

1. An improved method for minimizing the amount of boiler-heated water consumed in the premixing of hot and cold water inputs to a shower, said method comprising the steps of directing the premixed water exiting from said shower along an advantageous flow path for heat exchange, flowing the cold water input to said shower in heat exchange relation with said exiting water to produce a resulting lukewarm water source incident to the use thereof for said shower, and diminishing the boiler-heated hot water input to said shower of an extent permitted by use of said lukewarm water source, whereby whatever the storage volume limitation of said boiler-heated hot water it is extended for a greater duration of use for showering purposes because of said diminishment.

2. The improved method for minimizing the consumption of boiler-heated water for showers as claimed in claim 1, wherein said heat exchange between said exiting water and said cold water input is conducted immediately adjacent the drain of said shower, to thereby maximize the heat transfer therebetween.

3. The improved method for minimizing the consumption of boiler-heated water for showers as claimed in claim 2, wherein said exiting water is discharged through a U-shaped conduit to provide said advantageous flow path for heat exchange to the extent said shape prolongs the flow path thereof, and said heat exchange with said cold water input is conducted along said U-shape.

4. The improved method for minimizing the consumption of boiler-heated water for showers as claimed in claim 3, wherein said cold water input is passed in external relation to said water exiting through said U-shaped conduit.

5. The improved method for minimizing the consumption of boiler-heated water for showers as claimed in claim 3, wherein said cold water input is passed in internal relation to said water exiting through said U-shaped conduit.

6. The combination with a shower of the type having cold and boiler-heated warm water inputs thereto for premixing said water preparatory to use in showering and an exit drain for said discharging premixed water, an improvement for minimizing the amount of boiler-heated water consumed in said premixing comprising heat exchange means operatively disposed in said cold water input to said shower in heat exchange relation to said exit drain of said discharging premixed water, whereby said cold water is rendered lukewarm to contribute to lessening the amount of boiler-heated warm water for showering purposes.

7. The improvement for a shower as claimed in claim 6, wherein said exit drain includes a U-shaped conduit for said discharging premixed water and said heat exchange is conducted therewith during the flowing thereof through said U-shaped conduit, whereby the flow path is increased by said shape to correspondingly maximize heat transfer from said discharging premixed water.

8. The improvement for a shower as claimed in claim 7, including conduit means disposed within said U-shaped conduit for said cold water.

9. The improvement for a shower as claimed in claim 7, including conduit means for passing said cold water in external relation to said water exiting through said U-shaped conduit.

10. The improvement for a shower as claimed in claim 6, wherein said exit drain is formed as a helical trough and said heat exchanger is a conduit in a correspondingly helical configuration having an operative position disposed in said helical trough, whereby the exiting tepid water discharging in said helical trough and said inflowing water in said helical conduit pass in heat exchange relation with each other.

* * * * *